(12) United States Patent
Garrett (10) Patent No.: US 9,061,557 B1
(45) Date of Patent: Jun. 23, 2015

(54) AMPHIBIOUS BICYCLE FLOAT ATTACHMENT AND LIFT SYSTEM (71) Applicant: Patrick D. Garrett, Spicewood, TX (US)

(72) Inventor: Patrick D. Garrett, Spicewood, TX (US)

(*) Notice: Subject to any disclaimer, the term of this patent is extended or adjusted under 35 U.S.C. 154(b) by 149 days.

(21) Appl. No.: 13/867,065

(22) Filed: Apr. 20, 2013

(51) Int. Cl.
B60F 3/00 (2006.01)

(52) U.S. Cl.
CPC .................................. *B60F 3/0084* (2013.01)

(58) Field of Classification Search
CPC .. B63H 16/14; B63H 2016/202; B63H 16/12; B63H 2016/205; B60F 3/0084; B63B 35/73
USPC ............ 440/12.5, 12.51, 12.52, 12.53, 12.55, 440/12.62, 26, 27, 30
See application file for complete search history.

(56) References Cited

U.S. PATENT DOCUMENTS

| | | |
|---|---|---|
| 577,269 A | 2/1897 | Powley |
| 615,871 A | 12/1898 | Moller |
| 642,683 A | 2/1900 | Erickson |
| 691,805 A | 1/1902 | Perry |
| 799,667 A | 9/1905 | Payette |
| 801,071 A | 10/1905 | Fowler |
| 839,476 A | 12/1906 | Hartlett |
| 860,664 A | 7/1907 | Hill |
| 1,034,278 A | 7/1912 | Munsen |
| 1,060,620 A | 5/1913 | Osofs |
| 1,126,037 A | 1/1915 | Lehotsky |
| 1,206,587 A | 11/1916 | Peterson |
| 1,332,634 A | 3/1920 | Piateski |
| 1,409,965 A | 3/1922 | Owsianiecki |
| 1,610,778 A | 12/1926 | Helm |
| 1,831,229 A | 11/1931 | Clark |
| 1,869,139 A | 7/1932 | Gargiulo |
| 2,304,430 A | 12/1942 | Triolo |
| 2,323,261 A | 6/1943 | Vigo |
| 2,757,631 A | 8/1956 | Truter |
| 3,091,209 A | 5/1963 | Leiberman |
| 3,606,856 A | 9/1971 | Moraga |
| 3,640,239 A | 2/1972 | Petroskey |
| 3,791,332 A | 2/1974 | Gof |
| 3,844,246 A | 10/1974 | Locher |
| 3,954,079 A | 5/1976 | Gof |
| 3,987,747 A | 10/1976 | Locher |
| 4,092,945 A | 6/1978 | Ankert |
| 4,285,674 A | 8/1981 | Chew |
| 4,317,422 A | 3/1982 | Gabriel |
| 4,334,490 A | 6/1982 | Gabriel |
| 4,395,237 A | 7/1983 | Watanabe |
| 4,493,657 A | 1/1985 | Zeitler |

(Continued)

*Primary Examiner* — S. Joseph Morano
*Assistant Examiner* — Anthony Wiest (57) ABSTRACT

An amphibious float system removably and nondestructively attached to a bicycle, having floats that raise and lower simultaneously on pivoting arms that swing longitudinally in a fore and aft arc and lock in place in a desired position by hand manipulable connections for transition between land and water travel without modification of the bicycle. The bicycle remains fully assembled and the lift arms provide ample clearance above land and water to keep the bicycle and rider fully out of the water for dry feet operation. The system carries everything with it to convert between multiple modes of operation, including as an amphibious bicycle, an amphibious water cycle, a conventional bicycle, and a pontoon boat. A self-engaging drive system and removably attached rudder aid in changeovers for repeated land and water evolutions, and both kick-up when encountering land or underwater obstructions.

1 Claim, 6 Drawing Sheets

(56) References Cited

U.S. PATENT DOCUMENTS

| | | | |
|---|---|---|---|
| 4,559,892 A * | 12/1985 | Cascallana | 440/12.62 |
| 4,789,365 A | 12/1988 | Jones | |
| 4,936,801 A | 6/1990 | Herrit | |
| 5,088,944 A | 2/1992 | Kats | |
| 5,224,886 A | 7/1993 | Cunningham | |
| 5,316,508 A | 5/1994 | Landucci | |
| 5,387,140 A | 2/1995 | Cunningham | |
| 5,415,574 A | 5/1995 | Siviero | |
| 5,430,998 A * | 7/1995 | Albrecht | 56/8 |
| 5,443,405 A | 8/1995 | Zeyger | |
| 5,460,551 A | 10/1995 | Beres | |
| 5,547,406 A | 8/1996 | White | |
| 5,626,501 A | 5/1997 | He | |
| 5,782,480 A | 7/1998 | Phillips | |
| 5,803,774 A | 9/1998 | White | |
| 5,807,148 A | 9/1998 | Siviero | |
| 5,830,020 A | 11/1998 | Snyder | |
| 6,050,864 A | 4/2000 | Perdue | |
| 6,077,134 A | 6/2000 | Lam | |
| 6,135,830 A | 10/2000 | Elefant | |
| 6,267,631 B1 * | 7/2001 | Anderson | 440/12 |
| 6,309,263 B1 | 10/2001 | Mier-Maza | |
| 7,604,522 B1 | 10/2009 | Burnham | |
| 7,931,512 B2 | 4/2011 | Bortsov | |

\* cited by examiner

AMPHIBIOUS BICYCLE FLOAT ATTACHMENT AND LIFT SYSTEM

CROSS-REFERENCE

This application claims the benefit of provisional patent application Ser. No. 61/653,689, filed May 31, 2012 by the present inventor.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Amphibious travel presents unique challenges due to the dual nature of traveling over both land and water. For example, some attributes of the craft that are an advantage on land become a disadvantage on water, and vice versa. Prior art reveals how this dilemma has been handled previously with respect to amphibious bicycle floatation systems in general, and specifically with the ability to raise and lower the floatation devices.

The height, or elevation, of the floatation devices attached to a bicycle for amphibious travel, relative to the bicycle and the ground, impact its performance and the rider's comfort on land and water. While on water it is desirable to have the floatation devices below the bicycle wheels and pedals in order to lift the bicycle and rider sufficiently above the water to keep the bicycle and rider dry. Alternatively, on land, the opposite is desirable, to have the floatation devices and related support frame sufficiently above the bottom of the bicycle wheels, that is, as high above ground level as practical, to provide ample clearance for land obstructions over varied terrain.

Previously, amphibious bicycle floatation devices can be categorized into two general groups, those with floatation devices that are fixed in place, and those that employ a lift system for raising and lowering the floats. Generally those that do not employ a lift system fix the floats at the midpoint between the two optimum elevations for traveling over both land and water. This is not ideal, but rather an accommodation to make the craft amphibious. Those with a lift system have the ability to raise and lower the floats for better clearance over both land and water.

Among the examples of amphibious bicycle devices lacking the ability to raise and lower the floatation devices is U.S. Pat. No. 4,092,945, issued to Ankert (1978), which reveals an amphibious float attachment system for a conventional bicycle. Though it is amphibious, its limitations are immediately apparent since, without a lift system, the bicycle and rider remain partially submerged in the water during water travel, and the pontoon floats appear to have little ground clearance when on land. Also, the paddles attached to each pedal for propulsion would be very inadequate for meaningful water travel. U.S. Pat. No. 4,789,365, issued to Jones (1988), shows an alternative method of fixing an amphibious float system to a conventional bicycle. The float system cannot be raised or lowered, similar to the previous example, but the structure is arranged such that the bicycle and rider sit on top of the entire system. This keeps the bicycle and rider out of the water. However, it creates the undesirable option of having to remove the entire device from the bicycle in order to use the bicycle to travel on land. This takes time and effort, and likely tools. Also, once the floatation device has been removed there is no provision to transport it with the bicycle in the likely event that another conversion to water mode will be desired later. So the rider is stuck without the ability to cross more than one body of water over the entire ride, making it a non-amphibious system for practical purposes. U.S. Pat. No. 5,807,148, issued to Siviero (1998) solves the portability issue in one respect by making the entire float and frame system able to be stowed in a back-pack to be carried by the rider. It is also adaptable to a conventional bicycle. While this theoretically solves the issue of crossing multiple bodies of water on a single trip, the practicality of stopping, assembling or disassembling the frame system and inflating the pontoons, before every transition between land and water would be very time consuming and limiting. Because of the time and effort required to temporarily convert between land and water use, the previous two examples are not amphibious in their immediate form, and are therefore not practical for everyday recreation, sport, or travel where outings are likely short and multiple consecutive land and water crossings may be desired.

Among the examples of amphibious cycles having the ability to raise and lower their floatation devices is U.S. Pat. No. 6,050,864, issued to Perdue (2000), which demonstrates amphibious floats attached to a conventional bicycle having floats that fold up and down in a sideways motion. The floats must be uncoupled from each other and then folded individually to raise the floats, and water and land clearance issues exist as it appears portions of the bicycle and likely the rider's feet contact the water, similar to previously discussed systems where the floatation devices did not lift at all. U.S. Pat. No. 3,987,747 (Locher, 1976); U.S. Pat. No. 1,034,278 (Munsen, 1912); and U.S. Pat. No. 799,667 (Payette, 1905) show amphibious floatation systems that lift longitudinally in various ways and combinations, but they are cumbersome, complicated, and do not lift all of the needed floatation devices simultaneously and in the same direction for efficient conversion between land and water travel.

Advantages

Accordingly several advantages of one or more aspects are as follows: to provide an amphibious float attachment that can be temporarily connected to a bicycle, making it amphibious, having generally a frame structure and pontoon floats attached to it that deploy and recover expeditiously and simultaneously, and lock in place by hand manipulable connections, without the need for tools or reconfiguring the bicycle. The floats swing longitudinally in a fore and aft arc on pivoting arms simultaneously in the same direction, resulting in lifting the floats at twice the lift height as the length of the lift arms at the pivot point, allowing the lift system to be very efficient, compact and provide excellent clearance for the floats above both land and water, keeping the entire bicycle and the rider's feet dry and above the water when in water cycle mode, and the floats free and clear of ground obstructions when in amphibious land mode. And where bicycle remains fully assembled with no need to remove any parts or engage any systems or gears to the chain or sprockets of the bicycle. It has four modes of operation: as a conventional bicycle, as an amphibious bicycle in road mode, as an amphibious water cycle, and as a personal catamaran, without the need for tools to convert from one mode to another. Having also the characteristic of carrying with it in its amphibious road and water cycle modes everything needed to make unlimited consecutive water and land conversions and to also convert to the bike only mode or personal catamaran mode. Having light-weight inflatable floats, upright bicycle seating for optimized leg muscle use and efficient transfer of energy to the propulsion system, with underwater propeller propulsion for quiet and efficient movement, and drive transmission by an automatically-engaging friction wheel that makes contact with the back wheel of the bicycle. Having also a simple rudder attachment with a form-fitting rudder boot to the front wheel of the bicycle, held in place by bungees and hooks for the bungees for quick and easy attachment and removal, and provides natural and intuitive bicycle steering input to the rudder in water cycle mode. The connection of the rudder to the front wheel of the bicycle also allows it to rotate in an upward fashion when striking an underwater obstacle, beaching, or otherwise coming into contact with land.

The result is a float attachment and lift system for making a bicycle amphibious which overcomes many limitations of prior art, combines multiple previous achievements, and improves upon prior teaching to produce an efficient and practical amphibious cycle apparatus for recreation, sport and meaningful travel across water barriers.

Other advantages of one or more aspects will be apparent from a consideration of the drawings and ensuing description.

SUMMARY

In accordance with one embodiment a float attachment and lift system for making a bicycle amphibious, with a frame structure and longitudinally swinging arms that lift and lower the floats simultaneously into a desired position, having the ability to convert also to a personal catamaran or a conventional bicycle.

| REFERENCE NUMERALS | |
|---|---|
| 1 Bicycle | 2 Top Tube |
| 3 Head Tube | 4 Down Tube |
| 5 Seat Tube | 6 Seatstay |
| 7 Chainstay | 8 Headset |
| 9 Stem | 10 Fork |
| 11 Front Wheel | 12 Seat |
| 13 Seatpost | 14 Seatpost Clamp |
| 15 Rear Wheel | 16 Front Receiver Assembly |
| 17 Main Tube Bracket | 18 Head Tube Bracket |
| 19 Rear Receiver Assembly | 20 Seat Tube Bracket |
| 21 Lower Seatstay Bracket | 22 Adjustable Rear Frame Bar |
| 23 Rotating Receiver Tube | 24 Support Arm |
| 25 Front Frame Arm | 26 Lift Arm |

-continued

| REFERENCE NUMERALS | |
|---|---|
| 27 Pivot and Lockdown Bracket | 28 Rear Frame Arm |
| 29 Bolt | 30 Pivot Bolt |
| 31 Pin | 32 Lockup Bracket |
| 33 Pontoon Float | 34 Pontoon Frame |
| 35 Pontoon Strap | 36 Transmission Frame |
| 37 Transmission Friction Wheel | 38 Transmission Wheel Frame |
| 39 Transmission Wheel Tensioner Bungee | 40 Flexible Drive Housing |
| 41 Drive Tube | 42 Skeg |
| 43 Flexible Drive Shaft | 44 Propeller |
| 45 Rudder | 46 Rudder Boot |
| 47 Rudder Bungee | 48 Rudder Bungee Hook |
| 49 Catamaran Spacer Bar | 50 Trampoline |
| 51 Boat Seat | 52 Seatback Adjustment Strap |
| 53 Seat Attachment Strap | |

DETAILED DESCRIPTION

One embodiment of the amphibious bicycle float attachment lift system and frame structure is illustrated as follows.

Figure 1:
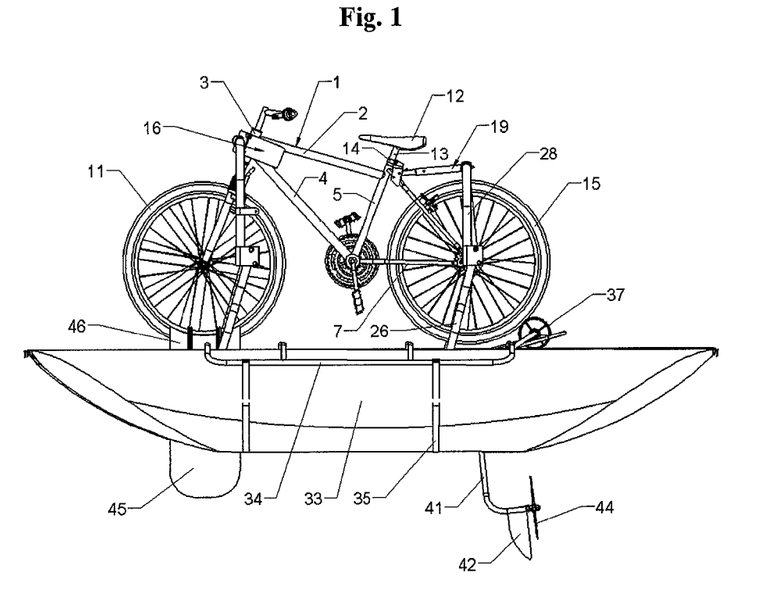
FIG. 1: Left side view, floats down.

FIG. 1 illustrates a left side view of one embodiment, with floats lowered, showing a conventional bicycle 1, having front and rear wheels 11 and 15, respectively, a frame consisting of top tube 2, down tube 4, seat tube 5, with seat 12, seatpost 13, seatpost clamp 14, and chain stay 7. Front receiver assembly 16 is attached to bicycle 1, fixed in place between top tube 2, down tube 4, and surrounding head tube 3. Rear receiver assembly 19 is attached to seatpost clamp 14 and rear frame arms 28. Lift arms 26 attach to pontoon frame 34 which attach to pontoon floats 33 and are held secure by pontoon straps 35. A transmission friction wheel 37 contacts rear wheel 15 of bicycle 1 and connects to drive tube 41, skeg 42 and propeller 44. Rudder boot 46 is attached to front wheel 11 and holds rudder 45.

Figure 2:
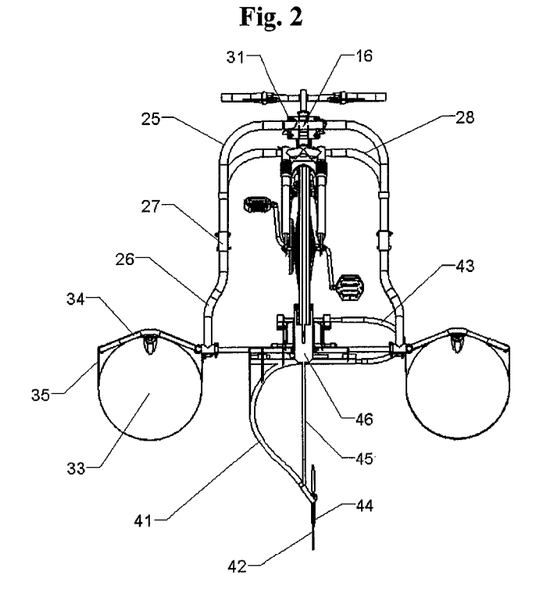
FIG. 2: Front view, floats down.

FIG. 2 illustrates floats in a lowered position showing front frame arms 25 held in place to front receiver assembly 16 by pins 31, and connected to pivot and lockdown brackets 27, which connect to lift arms 26 and pontoon frames 34.

Figure 3:
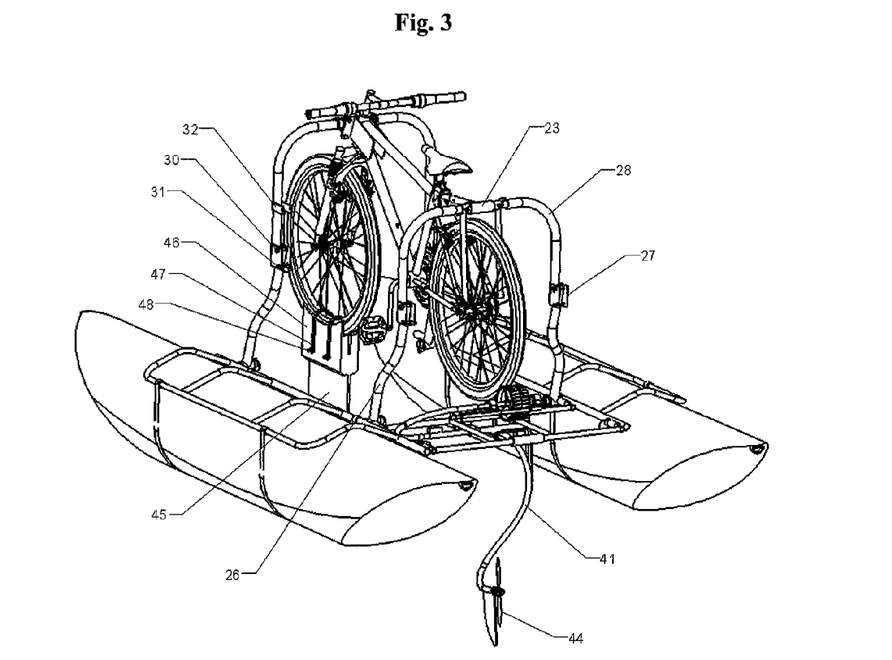
FIG. 3: Left rear isometric view, floats down.

FIG. 3 illustrates a rear isometric view with floats lowered, showing lockup bracket 32 and pivot bolt 30. Also shown in more detail is rudder boot 46 held in place with rudder bungees 47 connected to rudder bungee hooks 48.

Figure 4:
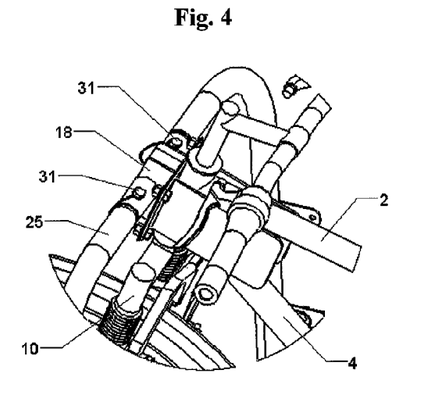
FIG. 4: Left isometric view of head tube bracket.

FIG. 4 illustrates front frame arms 25 held to head tube bracket 18 with pins 31.

Figure 5:
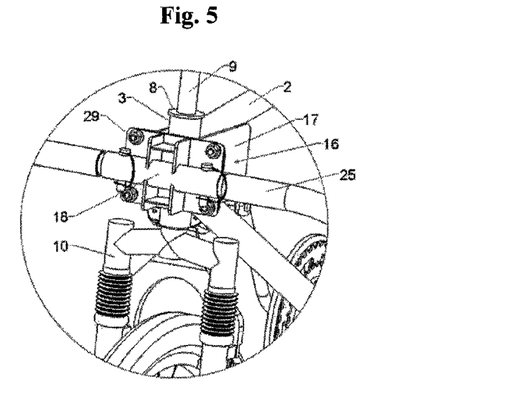
FIG. 5: Front isometric view of front receiver assembly.

FIG. 5 illustrates how bicycle stem 9 connects via headset 8 through head tube 3 to hold fork 10 in place. Front receiver assembly 16 is comprised of main tube bracket 17, consisting of two left and right sides, mirror images of each other, connected in the middle and wedged between top tube 2 and down tube 4 (FIG. 4), connected and pulled snug to head tube bracket 18 with bolts 29, held fast around head tube 3.

Figure 6:
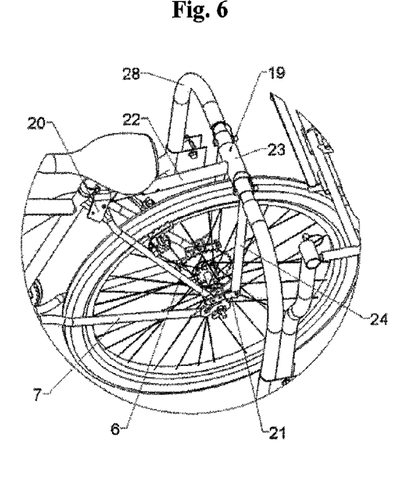
FIG. 6: Left isometric view of rear receiver assembly.

FIG. 6 illustrates rear receiver assembly 19, comprising rotating receiver tube 23, adjustable rear frame bar 22, and support arms 24. Adjustable rear frame bar 22 is held on one end by seat tube bracket 20 which is connected to seatstays 6 and seatpost clamp 14 (FIG. 1), and on the other end to rotating receiver tube 23 which is held up by support arms 24 connected to seatstays 6 by lower seatstay brackets 21. Rear receiver assembly 19 connects to and supports rear frame arms 28.

Figure 7:
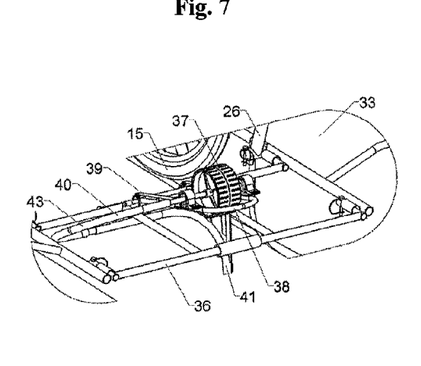
FIG. 7: Left rear isometric view of transmission frame.

FIG. 7 illustrates transmission frame 36 and related components when pontoon floats 33 are in a lowered position. Transmission friction wheel 37 is in contact with rear wheel 15 of bicycle 1 (shown in FIG. 1) and connects to transmission wheel frame 38. Transmission wheel frame 38 and transmission friction wheel 37 are held in tension with two transmission wheel tensioner bungees 39 attached to either side of the upper portion of transmission wheel frame 38 and front end of transmission frame 36. Transmission friction wheel 37 connects to flexible drive shaft 43, housed inside of flexible drive housing 40 and inserts into drive tube 41.

Figure 8:
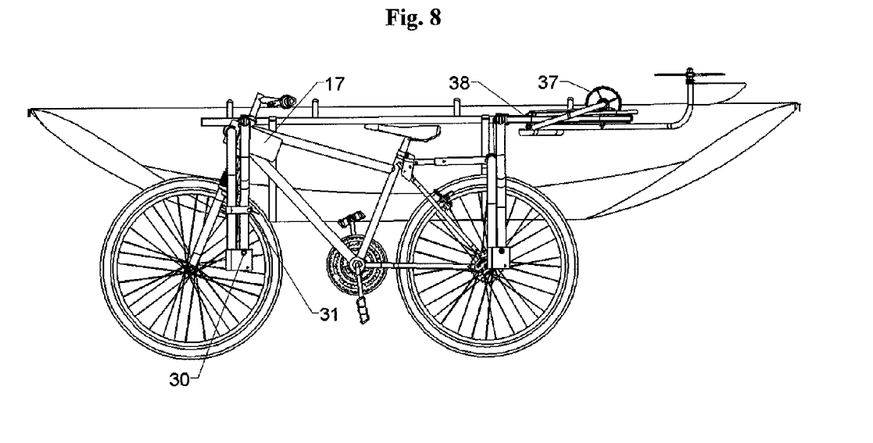
FIG. 8: Left side view, floats up, with near float removed for clarity.

FIG. 8 illustrates a left side view with floats up and the near float removed from the figure to reveal otherwise hidden components, showing a clear view of pivot bolt 30 with floats locked in a raised position and held securely in place with pins 31.

Figure 9:
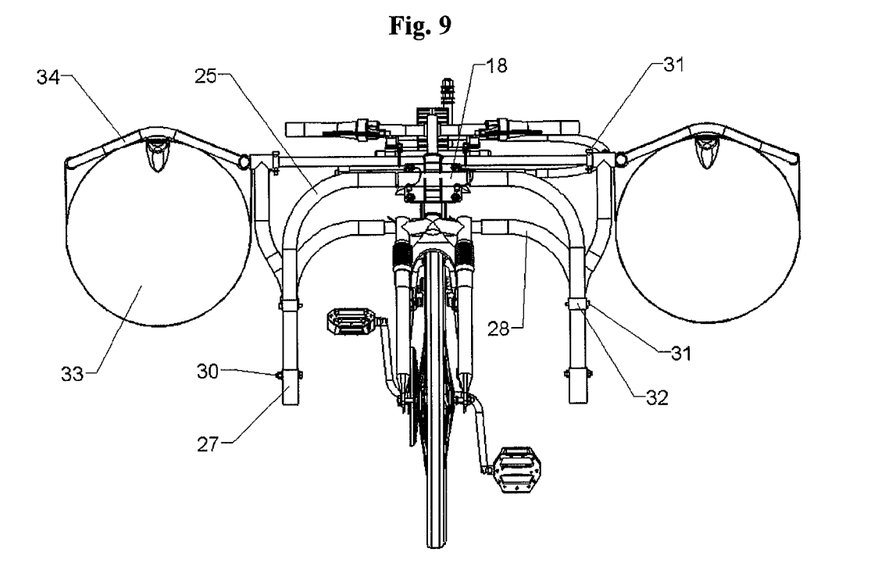
FIG. 9: Front view, floats up.
Figure 10:
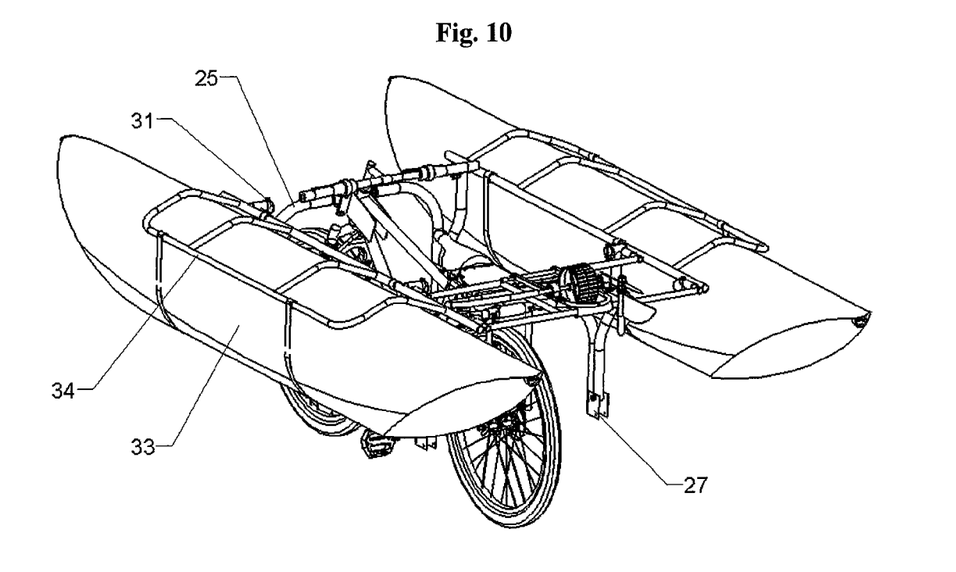
FIG. 10: Left rear isometric view, floats up.

FIGS. 9 and 10 illustrate floats in a raised position showing a relative perspective of the ground clearance of pivot and lockdown brackets 27 and floats 33 when in amphibious cycle mode for land use. A clear view is revealed of pivot bolt 30, and pin 31 inserted in lockup bracket 32 to secure floats 33 in the raised position. Also shown are pins 31 inserted into pontoon frames 34 to secure frames to lift arms 26 (shown previously in lowered position in FIG. 2).

Figure 11:
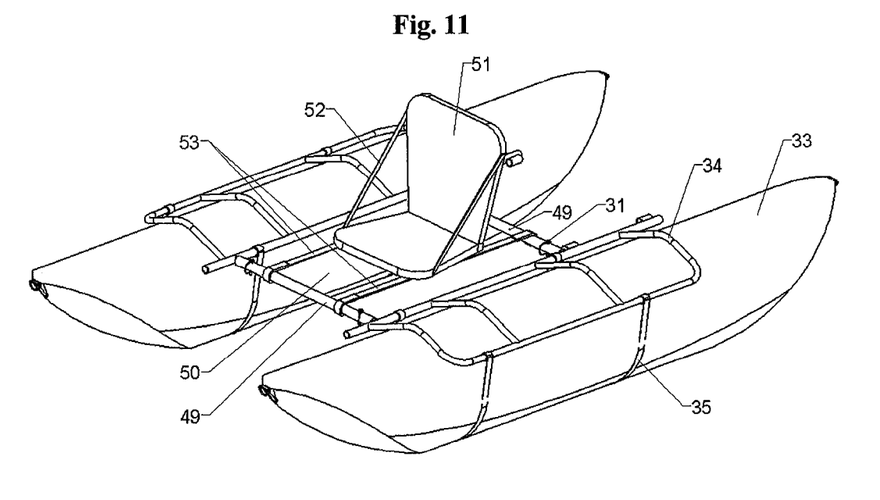
FIG. 11: Left front isometric view of pontoon boat form.

FIG. 11 is a front isometric view of one embodiment in boat mode, showing the same pontoon floats 33 and pontoon frames 34 attached by catamaran spacer bars 49, fixed together with pins 31 at each connection point to pontoon frames 34, with trampoline 50 stretched between catamaran spacer bars 49. Boat seat 51 with seatback adjustment straps 52 are attached to trampoline 50 with seat attachment straps 53.

Figure 12:
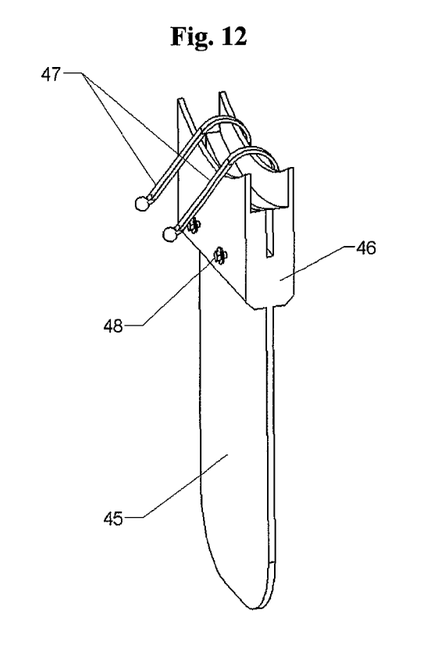
FIG. 12: Isometric view of rudder.

FIG. 12 illustrates an isometric view of rudder 45 housed in rudder boot 46 with rudder bungees 47 shown removed from front wheel 11 of bicycle 1 (both shown previously in FIG. 1) and rudder bungee hooks 48.

Figure 13:
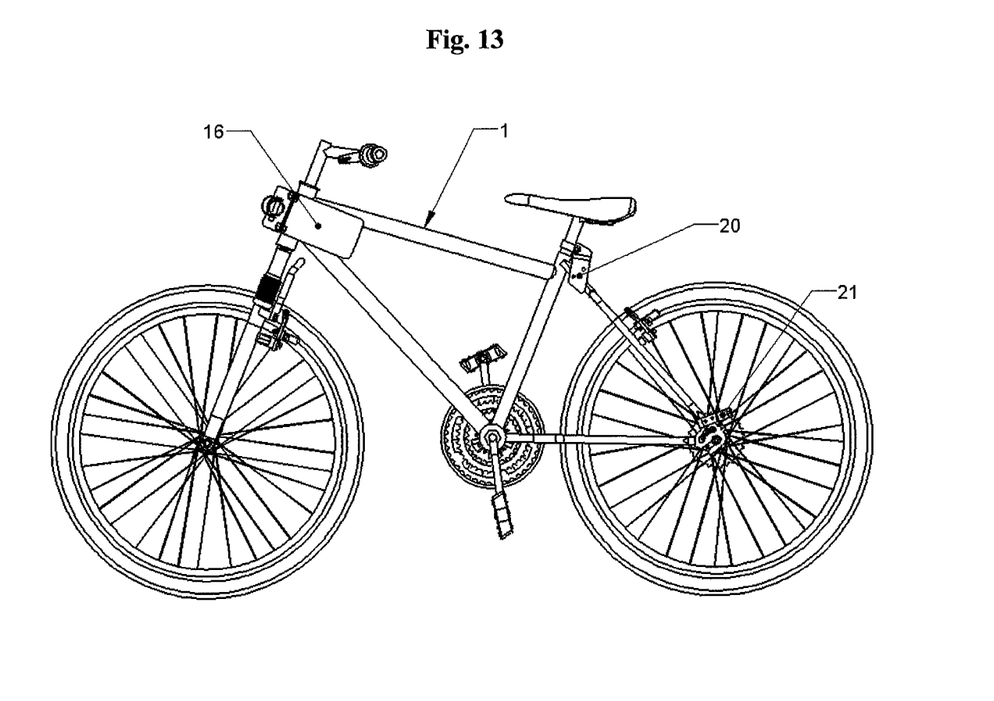
FIG. 13: Left side view of conventional bicycle form with floats removed.

FIG. 13 illustrates the left side view of bicycle 1 in conventional bicycle mode with only front receiver assembly 16, seat tube bracket 20, and lower seatstay brackets 21 attached.
Operation—Attachment of Brackets to Bicycle—FIGS. 4, 5 & 6

Four brackets are nondestructively and removably attached to bicycle 1 serving as attachment points for the amphibious and water cycle embodiments of the lift and attachment system. Front receiver assembly 16 of FIG. 5 is slipped into place between top tube 2 and down tube 4 (FIG. 4) to fit snugly in place and held to head tube bracket 18 with four bolts 29. Seat tube bracket 20 (FIG. 6) is attached to seatpost clamp 14 (FIG. 1) and seatstays 6. Two lower seatstay brackets 21 are attached to both seatstays 6 on each side of the rear of bicycle 1.
Operation—Connection of Frame Structure to Brackets on Bicycle—FIGS. 4, 5, 6, & 7

Once the four brackets are attached to bicycle 1, as described above, FIG. 5 shows how front frame arms 25 slide into head tube bracket 18 and are secured with pins 31 (FIG. 4). Rear receiver assembly 19 is held in place by connecting adjustable rear frame bar 22 to seat tube bracket 20 with one pin 31, and two support arms 24 emanating from rotating receiver tube 23 are connected to lower seatstay brackets 21 on either side of bicycle 1 with two pins 31. Rear frame arms 28 slide into rear receiver assembly 19 in the same fashion as front frame arms 25 and are secured with pins 31. Transmission frame 36 already having affixed to it other drive components, attaches to pontoon frame 34 with two pins 31. Next, pontoon frames 34 are attached to two lift arms 26 on each side of bicycle 1 with pins 31.
Operation—Amphibious Bicycle—FIGS. 8 & 9

To operate the apparatus on land as an amphibious bicycle, carrying with it everything needed to operate in the other modes, simply reach down toward the rear of bicycle 1 and grasp both pontoon frames 34 and swing them up to the raised position until lift arms 26 (FIG. 2) contact lockup brackets 32 and lock in place with pins 31, one on either side of the apparatus in the holes provided in lockup brackets 32.

FIG. 3 shows lift arms 26 are pivotally attached to pivot and lockdown brackets 27 with pivot bolts 30. Lift arms 26 rotate about pivot bolts 30 in a longitudinally swinging arc raising or lowering pontoon floats 33 and all related components simultaneously and expeditiously in one motion at twice the height of lift arms 26, allowing ample clearance above land or water in one lifting motion. There is nothing to connect or disconnect from the bicycle or drive system, and the apparatus is now ready for operation as an amphibious bicycle on land.
Operation—Amphibious Water Cycle—FIGS. 1, 2 & 3

To convert from amphibious land mode to water mode as a water cycle, simply pull two pins 31 (FIG. 9) from lockup brackets 32 on either side of the apparatus, lower pontoon floats 33 to the ground and then raise bicycle 1 in a rearward lifting motion until it stops in the raised position when the four lift arms 26 contact the forward edge of the four pivot and lockdown brackets 27. Insert four pins 31 into the holes in the trailing edges of pivot and lockdown brackets 27 to lock pontoon floats 33 securely in the lowered position. Next, attach rudder boot 46 to front wheel 11 with rudder bungees 47 already attached to one side of rudder boot 46, and pull them across the inside rim of front wheel 11 and loop them over two rudder bungee hooks 48 on the other side of rudder boot 46. Since rudder 45 is attached to the freely rotating front wheel 11, rudder 45 will kick-up if it hits an underwater obstruction and when launching and beaching. Natural and intuitive bicycle steering is achieved in water as with normal bicycle steering on land.

Transmission friction wheel 37 will automatically engage rear wheel 15 of bicycle 1 when the apparatus is lowered because of the tension that will be applied from transmission wheel tensioner bungees 39 (FIG. 7) when pontoon floats 33 are lowered into place. Drive tube 41 will kick-up in a swinging motion when contacting an underwater obstruction, beaching or when otherwise contacting land.

The apparatus can be readily and repeatedly swung into land or water mode use expeditiously for unlimited land and water crossings without the use of tools, and transporting with it everything needed to operate in bicycle-only mode or as a personal catamaran boat.
Operation—Boat Mode—FIG. 12

To operate in boat mode as a personal catamaran, simply pull pins 31 from pontoon frames 34, attach trampoline 50 to catamaran spacer bars 49, attach catamaran spacer bars 49 to pontoon frames 34 with pins 31, and attach seat 51 to catamaran spacer bars 49 on top of trampoline 50 with seat attachment straps 53 for stability.
Operation—Bicycle Mode—FIG. 13

To operate as a conventional bicycle with the frame structure removed, simply pull pins 31 from transmission frame 36 (FIG. 7) to remove transmission frame 36, then pull pins 31 from front and rear frame arms, 25 and 28 respectively, to release bicycle 1. If it is desired to remove rear receiver assembly 19 from bicycle 1 prior to riding, simply remove pin 31 from seat tube bracket 20 (FIG. 6), thereby freeing adjustable rear frame bar 22, and remove pins 31 from lower seatstay brackets 21 on either side of bicycle 1. Now bicycle 1 is ready to ride on land as a conventional bicycle with only front receiver assembly 16, seat tube bracket 20, and two lower seatstay brackets 21 attached to bicycle 1, as shown in FIG. 13.

CONCLUSION, RAMIFICATIONS AND SCOPE

Thus the reader will see that at least one embodiment of the amphibious float attachment provides a more efficient and effective means of amphibious bicycle and water cycle operation, as well as the ability to quickly and easily convert the apparatus to a conventional bicycle or personal catamaran, for effective travel, recreation and exercise over land and water in multiple modes.

While the above description contains many specifics, these should not be construed as limitations on the scope, but rather as an exemplification of several embodiments thereof. Many other variations of size, material, shape, color, densities, and configurations are possible. For example, a variety of suitable structural materials could be employed, such as steel, wood, aluminum, plastic, composites, carbon fiber, etc., and could be round, oval, square, triangular, etc.; the pontoon floats could be made of a variety of material, such as fabric, foam, wood, plastic, etc., and could be solid, hollow, semi-rigid, inflatable, etc.; and the connections and holding devices could be pins, latches, catches, straps, hooks, bungees, etc., suitable for the intended use.

Accordingly, the scope should be determined not by the embodiments illustrated, but by the appended claims and their legal equivalents.

I claim:

1. An amphibious float attachment apparatus for a bicycle comprising:
   a front receiver assembly removably and nondestructively attached to a front of said bicycle at a head tube,
   a plurality of brackets removably and nondestructively attached to a rear of said bicycle at a seat tube,
   a rear receiver assembly removably attached to said brackets on the rear of said bicycle, said rear receiver assembly comprised of an adjustable rear frame bar extending rearward from said plurality of brackets, a rotating receiver tube at a rearward end of said rear frame bar, said rotating receiver tube arranged perpendicular to said rear frame bar,
   a plurality of front and rear frame arms, each frame arm having a upper end and a lower end, the upper ends of said front frame arms removably attached to said front receiver assembly and the upper ends of said rear frame arms connected to said rear receiver assembly at the receiver tube, each said frame arm having a pivot bracket on the lower end,
   a plurality of rotating lift arms pivotally attached to said pivot brackets, whereby said rotating lift arms move in a longitudinally swinging arc in a direction along the length of said bicycle causing the ends of said lift arms opposite said pivot brackets to be raised above or lowered below said pivot brackets, said lift arms adapted to be locked in a desired position on said pivot brackets to prevent rotation,
   a pair of spaced-apart float frames consisting of one port float frame and one starboard float frame, said float frames coupled together, said float frames rotationally coupled to said lift arms whereby the movement of said coupled together lift arms and float frames causes all said lift arms and float frames to move simultaneously and in the same direction resulting in a change in height of said float frames, said rotationally coupled lift arms and float frames are adapted to allow said float frames to remain oriented in an upright position, said float frames spaced apart at sufficient distance to allow stability on water and said bicycle and rider to operate between said float frames over land or water without interference with any part of said attachment apparatus, and;
   a plurality of floats removably attached to the underside of said float frames, each float frame having at least one float, for buoyancy on the water.

* * * * *